United States Patent [19]

Chelard et al.

[11] Patent Number: 5,386,576
[45] Date of Patent: Jan. 31, 1995

[54] METHOD AND APPARATUS FOR ASSOCIATING THE RECEPTION OF RESET PULSES BY A MICROPROCESSOR WITH ACCESS TO DIFFERENT SUBPROGRAMS

[75] Inventors: Gilles Chelard, Issou; Alain Sague, Rueil Malmaison, both of France

[73] Assignee: Valeo Neiman, France

[21] Appl. No.: 49,051

[22] Filed: Apr. 19, 1993

Related U.S. Application Data

[63] Continuation of Ser. No. 639,010, Jan. 9, 1991, abandoned.

[51] Int. Cl.$^6$ ............................................. G06F 1/24
[52] U.S. Cl. ................................. 395/750; 395/725; 395/700
[58] Field of Search ............... 395/750, 725, 700, 575; 371/66, 12; 364/707, 261.6, 261.8, 261.5, 280.2, 280.3, DIG. 1, 938.1, 975.2, DIG. 2

[56] References Cited

U.S. PATENT DOCUMENTS

| | | | |
|---|---|---|---|
| 4,030,073 | 6/1977 | Armstrong, Jr. | 395/775 |
| 4,228,502 | 10/1980 | Wakasugi | 395/700 |
| 4,432,049 | 2/1984 | Shaw et al. | 395/800 |
| 4,489,394 | 12/1984 | Borg | 395/750 |
| 4,590,553 | 5/1986 | Makoto Noda | 395/750 |
| 4,590,557 | 5/1986 | Lillie | 395/700 |
| 4,812,677 | 3/1989 | Perry | 307/296 R |
| 4,965,550 | 10/1990 | Wroblewski | 340/524 |
| 5,018,062 | 3/1991 | Culler et al. | 395/425 |
| 5,073,943 | 12/1991 | Chapman | 381/86 |
| 5,081,586 | 1/1992 | Barthel et al. | 395/750 |
| 5,134,580 | 7/1992 | Bertram et al. | 395/650 |
| 5,159,217 | 10/1992 | Mortensen et al. | 307/597 |

FOREIGN PATENT DOCUMENTS

| | | | |
|---|---|---|---|
| 9862 | 4/1989 | European Pat. Off. | G06F 1/00 |
| 3248689 | 9/1983 | Germany | G06F 1/00 |
| 8909957 | 10/1989 | WIPO | G06F 1/00 |

*Primary Examiner*—Jack B. Harvey
*Assistant Examiner*—Glenn A. Auve

[57] ABSTRACT

A method of associating the reception of a reset pulse by a microprocessor with access to a specific subprogram depending on whether the reset pulse is associated with a system incorporating the microprocessor being switched on for the purposes of "waking up" the microprocessor, or whether it constitutes a request coming from some other unit in the system, the method being wherein it comprises the following steps: on switch-on, causing a logical data item accessible by the microprocessor to change from a first state to a second state only after a certain time interval has elapsed since the switch-on; on each occasion that a reset pulse is received, reading the logical data item before the time interval has elapsed; and depending on whether the logical data item is in its first state or in its second state, branching either to an initialization subprogram appropriate to switch-on, or else to a subprogram appropriate to processing the request.

4 Claims, 2 Drawing Sheets

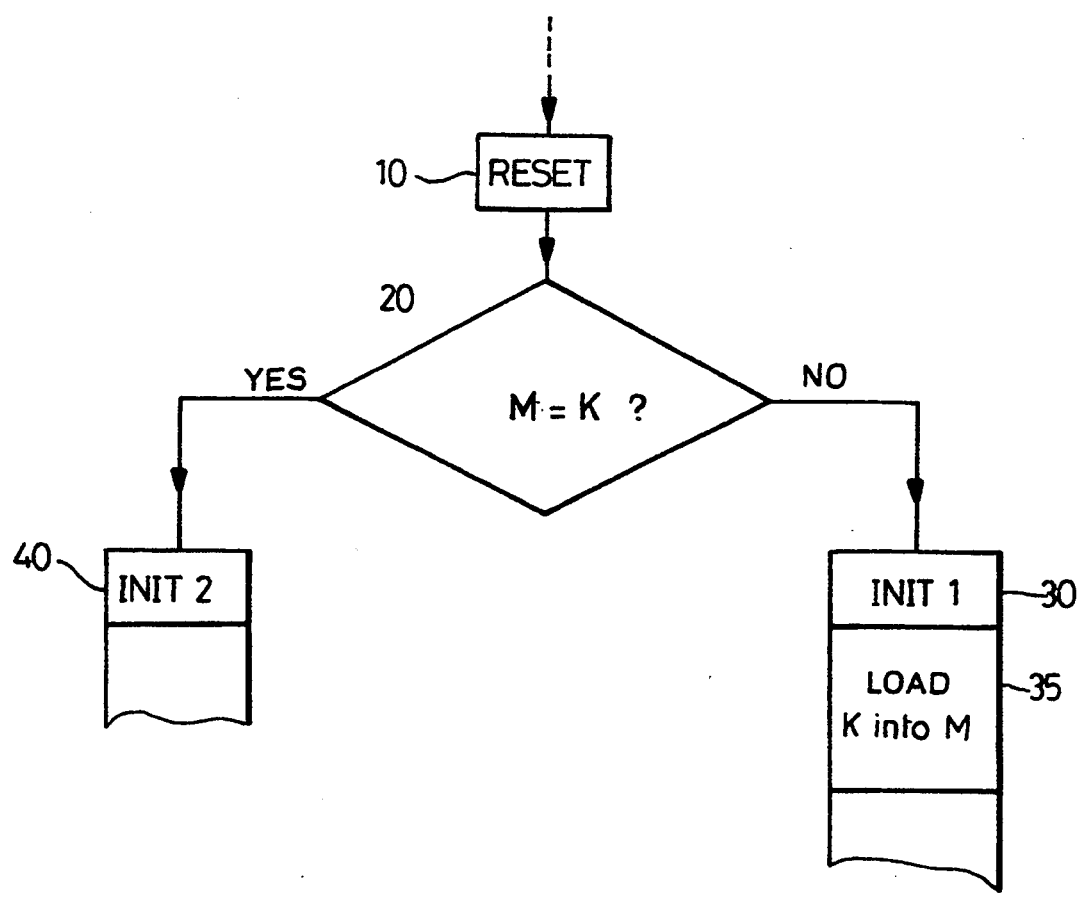
FIG_3

METHOD AND APPARATUS FOR ASSOCIATING THE RECEPTION OF RESET PULSES BY A MICROPROCESSOR WITH ACCESS TO DIFFERENT SUBPROGRAMS

This is a continuation of co-pending application Ser. No. 07/639,010 filed on Jan. 9, 1991, now abandoned.

The present invention relates in general to microprocessor systems, and more particularly it relates to a method and apparatus for associating the reception of reset pulses by a microprocessor with access to different subprograms depending on the origins of the pulses.

BACKGROUND OF THE INVENTION

In the car industry, in particular, it is conventional for manufacturers to require electronic systems fitted with microprocessors to consume as little electricity as possible. That is why such a microprocessor is typically left in a dormant condition so long as it is not required to perform any operation. Its electricity consumption under such conditions is extremely low (about 10 microamps).

In addition, it is now common practice to use such a microprocessor to perform a plurality of functions by calling different specific subprograms contained in its non-volatile memory (ROM).

In order to "wake up" the microprocessor when a given subprogram is to be run, a pulse is applied either to the microprocessor's reset input terminal RESET, or to its interrupt input terminal INT. In most cases, these are the only two terminals accessible from the outside to act on the operation of the microprocessor.

In entirely conventional manner, a reset pulse is applied to the microprocessor whenever the system is switched on.

Thus, in theory, only the terminal INT is accessible for acting on the operation of the microprocessor from the outside.

When a plurality of units in the system are associated with the microprocessor and need to be able to "wake it up", they must therefore share access to the terminals RESET and INT. Unfortunately, the microprocessor cannot then distinguish immediately on being "woken up" between the various possible origins of this particular "awakening", even though it would be desirable to branch without loss of time to the appropriate subprogram depending on which unit has "woken it up".

The present invention seeks to mitigate these drawbacks of the prior art and to provide a method enabling a microprocessor to distinguish between a reset pulse associated with the system being switched on and a reset pulse having a different origin and to do this quite simply and cheaply.

SUMMARY OF THE INVENTION

To this end, the present invention provides a method of associating the reception of a reset pulse by a microprocessor with access to a specific subprogram depending on whether the reset pulse is associated with a system incorporating said microprocessor being switched on for the purposes of "waking up" the microprocessor, or whether it constitutes a request coming from some other unit in the system, the method comprising the following steps:
- on switch-on, causing a logical data item accessible by the microprocessor to change from a first state to a second state only after a certain time interval has elapsed since said switch-on;
- on each occasion that a reset pulse is received, reading said logical data item before said time interval has elapsed; and
- depending on whether the logical data item is in its first state or in its second state, branching either to an initialization subprogram appropriate to switch-on, or else to a subprogram appropriate to processing said request.

In a first implementation of the invention, the step of causing the logical data item to change is performed by a circuit connected to a power supply voltage source for the microprocessor and to an input/output terminal of said microprocessor and disposed to apply to said terminal a signal which passes from a low logic level to a high logic level only after said time interval has elapsed.

In a second implementation, the step of causing the logical data item to change is performed by a circuit connected to a power supply voltage source for the microprocessor and to an input/output terminal of said microprocessor and disposed to apply to said terminal a signal which passes from a high logic level to a low logic level only after said time interval has elapsed.

In a third implementation, the first state of the logical data item is given by the contents immediately after switch-on of a location in the read/write memory associated with the microprocessor, and the step consisting in causing said logical data item to change is accomplished by giving said location different contents only after the initialization subprogram associated with switch-on has finished running.

The invention also provides apparatus for performing the above method, the apparatus comprising a circuit connected to a power supply voltage source of the microprocessor and to an input/output terminal of said microprocessor and disposed to apply to said terminal a signal which passes from a low logic level to a high logic level constituting the second state of the logical data item, only after said time interval has elapsed.

Preferably, the circuit comprises a resistor connected between the microprocessor power supply voltage source and the input/output terminal of said microprocessor, and a capacitor connected between said input/output terminal and ground.

Finally, the invention provides apparatus for performing the above method, which apparatus comprises a circuit connected to a power supply voltage source of the microprocessor and to an input/output terminal of said microprocessor and disposed to apply to said terminal a signal which passes from a high logic level to a low logic level constituting the second state of the logical data item, only after said time interval has elapsed.

This circuit preferably comprises a capacitor connected between the microprocessor power supply voltage source and the input/output terminal of said microprocessor, and a resistor connected between said input/output terminal and ground.

BRIEF DESCRIPTION OF THE DRAWINGS

An embodiment and an implementation of the invention are described by way of example with reference to the accompanying drawings, in which:

FIG. 3 is a flow chart for explaining how a second implementation of the invention is performed.

DETAILED DESCRIPTION

Figure 1:
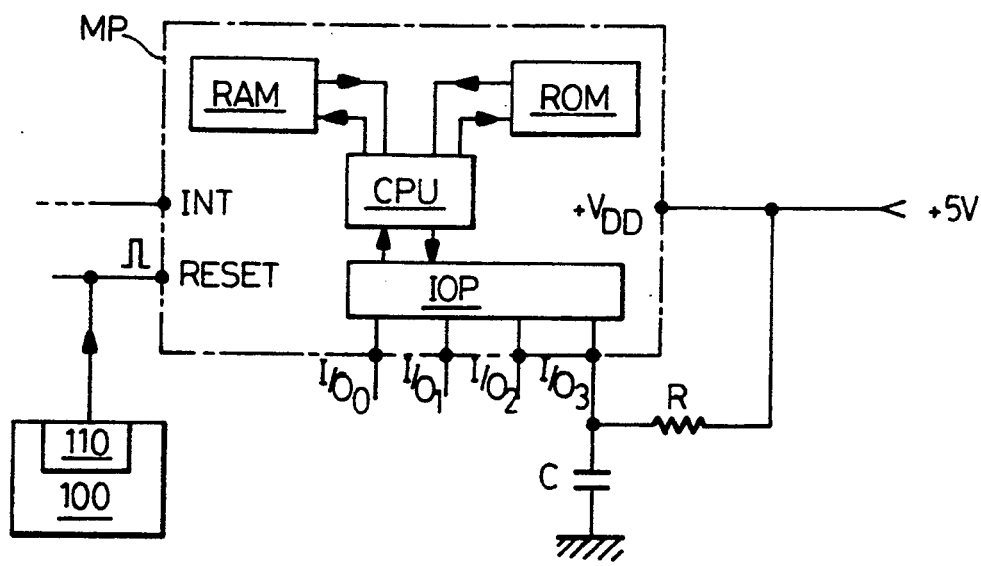
FIG. 1 is a fragmentary diagram of a circuit of the present invention for performing a method according to a first implementation of the invention.

With reference initially to FIG. 1, a microprocessor MP conventionally includes a central processor unit CPU, a read/write memory RAM, a non-volatile memory ROM containing programs, and input/output ports IOP. For example, the microprocessor may include these various units in a single package. For communication with the outside, the microprocessor includes, in particular, a reset input RESET and an interrupt input INT, in entirely conventional manner.

There are also several input/output terminals I/O (in this case there are four such terminals referenced $I/O_0$ to $I/O_3$ and they are connected to the input/output ports IOP incorporated in the package).

One of these terminals, in this case the terminal $I/O_3$, is connected to a first terminal of a resistor R and to the first terminal of a capacitor C. The other terminal of the capacitor is connected to ground (0 V) while the other terminal of the resistor is connected to the power supply voltage $V_{DD}$ (e.g. 5 V) for the microprocessor.

In the present example, the reset input terminal RESET is used to "wake up" the microprocessor both when the system is switched on and when locking and unlocking access to the vehicle by means of a key inserted in a lock in one of the doors, in which case the microprocessor begins by branching To a subprogram for confirming the received command (to distinguish between a genuine command and an accidental interference signal), and it subsequently executes a command if validly received. The corresponding unit is represented diagrammatically by a box 100 and it includes a circuit 110 suitable for generating a reset pulse suitable for the microprocessor. The microprocessor MP is programmed in such a way that each time it receives a reset pulse on its input RESET, it executes (very quickly and before performing any other operation) a read of the information present on input/output terminal $I/O_3$, for purposes explained below.

In addition, the input terminal INT receives a signal that "wakes up" the microprocessor whenever an infrared access locking/unlocking signal is received by an appropriate receiver (not shown) so as to call in conventional manner a subprogram for verification purposes in which a code received in the infrared signal is compared with a code stored in the read/write memory or in the non-volatile memory.

Figure 2:
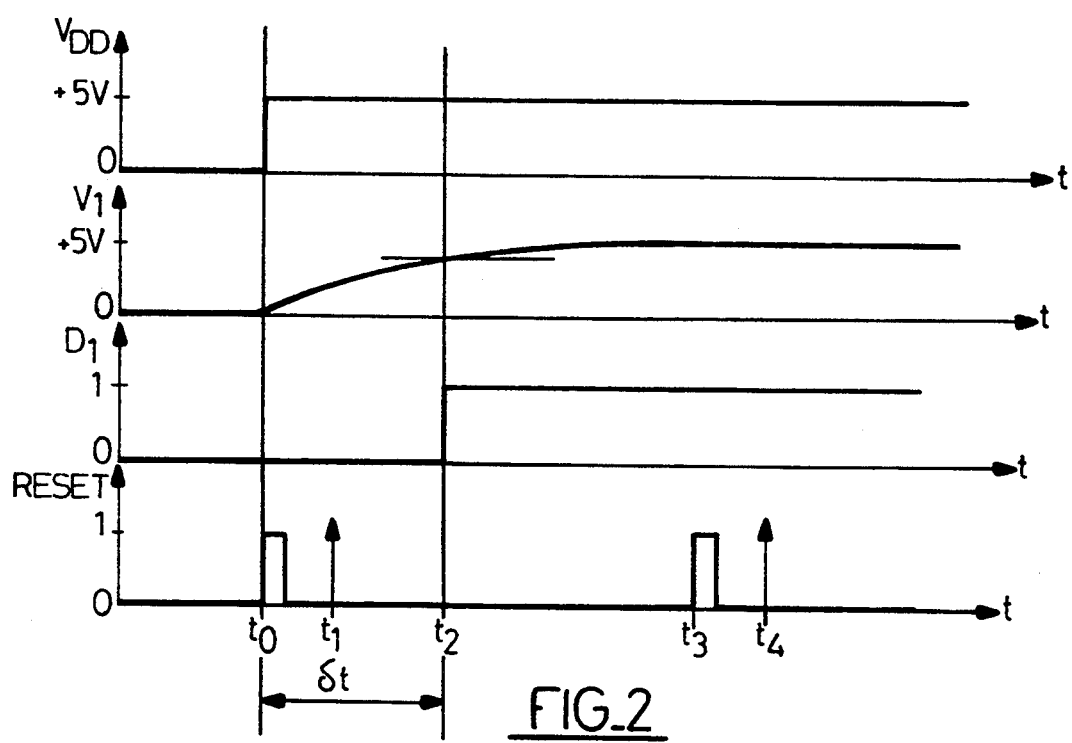
FIG. 2 is a timing diagram showing the behavior of the circuit of FIG. 1.

The operation of the above-described circuit is now explained with reference to the timing diagram of FIG. 2.

Initially, when the system is switched on at an instant $t_0$, the voltage $V_{DD}$ changes suddenly from 0 V to +5 V. In contrast, the voltage $V_1$ on the terminal $I/O_3$ increases from 0 V to +5 V much more slowly, as shown, given the time constant of the RC circuit applied thereto.

As a result, the logic signal $D_1$ present on this input changes from low level "0" to high level "1" only at some instant $t_2$ which is significantly later than the instant $t_0$, with the delay of $t_2$ relative to $t_0$ being written In addition, at instant $t_0$, a pulse is applied to the reset input of the microprocessor.

After being switched on in this way, the microprocessor reads the data present on $I/O_3$ at an instant $t_1$ which is selected during design of the program in such a manner as to occur before instant $t_2$, and the data is observed to be a logic "0".

It is reading a "0" in this way that informs the microprocessor that the reset pulse is a switch-on reset pulse. It therefore branches to a subprogram for initializing parameters, clearing memories, etc . . . , which is conventionally performed by the microprocessor on being switched on.

Later on, when the microprocessor receives another reset pulse on its input RESET (instant $t_3$), it will again read the logic state present on input $I/O_3$ in the same manner as before, this time at an instant $t_4$. Given that no change has occurred in the voltage VDD during this short period, the data as read is at and remains at logic level "1" during the read operation at instant $t_4$.

It is by reading a logic "1" in this way that the microprocessor can identify the reset pulse as coming from some origin other than being switched on (and in particular from an attempt at locking or unlocking access to the vehicle by means of a key).

Thus, means that are simple, cheap, and easy to program (reading a port and performing a conditional branch) serve to enable the microprocessor to distinguish in completely reliable manner between a reset associated with the system being switched on and a reset which is associated with any other operation that some part of the system may request the microprocessor to perform.

As mentioned above, it may be observed that the positions of the resistor and the capacitor as shown in FIG. 1 can be interchanged. Under such circumstances, the voltage applied to input $I/O_3$ passes slowly from +5 V to 0 V during system switch-on, whereas it remains constantly at 0 V under steady conditions. It is then the delay associated with changing over from the high level to the low level after switch-on that serves to distinguish a switch-on reset from any other type of reset.

FIG. 3 shows another implementation of the invention.

In this second implementation, reception of a reset pulse on the input RESET of the microprocessor (step 10) causes an immediate branch to a particular subprogram in which:

the contents of a specified location M in the read/write memory RAM of the microprocessor is tested (step 20);

if this contents differs from a logic value K, then a branch is made to a subprogram INIT1 corresponding to the operations which the microprocessor should perform whenever the system is switched on (setting up parameters, clearing memory and registers, . . . ); and when subprogram INIT1 has completed its operation (step 30) a logic value K is loaded into the specified memory location M (step 35); and in the event of the contents of M being equal to K, than a branch is made to a different subprogram referred to as INIT2 and which corresponds to the operations that need to be performed when the origin of the reset pulse is other than system switch-on (step 40). As in the above example, this may be a subprogram for confirming a command to lock or unlock access to the vehicle, and then for executing the command, where appropriate.

The program described above operates as follows: when a reset pulse is associated with system switch-on, location M contains a value that differs from the value K since by construction the read/write memory is cleared when the system is switched off. Initialization is then performed using INIT1 which corresponds to system switch-on, and the value K is then loaded into location M.

Whenever a subsequent reset pulse is applied to the input RESET without the system being switched off in the meantime, it is observed at step 20 that memory location M does indeed contain K, and a branch is therefore performed to the subprogram INIT2 for controlling this second type of reset.

It should be observed that in order to obtain proper operation of this second implementation, the value K must be different from the value contained in memory location M under consideration when the system is switched on. In the event of this memory being filled by construction entirely with logic zero on being switched on, it suffices in practice for the value K to be chosen to be different from zero, and to have some arbitrary number of bits. Similarly, if the memory contains only logic level "1" on being switched on, then the S0 value K should be constituted by a word containing at least one logic zero, and in the limit just one zero bit.

In contrast, if the contents of the memory. RAM is by construction a random distribution of logic "0" and "1", then K must be in the form of a word having as large as possible a number of bits so as to avoid the contents of M accidentally taking up the predetermined value K on switch-on.

Naturally, the invention is not limited to the implementations described above and shown in the drawings, and the person skilled in the art will be capable of making variants or modifications within the scope of the invention.

In particular, although the present invention has been described in an application where it is desired to distinguish between the microprocessor being "woken up" on being switched on, being "woken up" for remote locking/unlocking of accesses, and being "woken up" for locking/unlocking accesses under control of a key, it will naturally be understood that the invention is applicable to making distinctions of arbitrary type and/or nature. For example, the reset pulse or The interrupt pulse may be applied while the microprocessor is being taught a new remote control code, or when interchanging data with an electronic injection computer for the engine, which computer may be connected to the microprocessor.

More generally, although the present invention is described in the context of a microprocessor system for auxiliary functions of a motor vehicle, the invention is naturally advantageously applicable whenever any type of microprocessor is required to make a distinction between a reset related to the microprocessor being switched on and a reset applied thereto by some other unit of the system, thus having the practical effect of a top priority interrupt.

We claim:

1. In a system including a microprocessor and other units, the system applying to the microprocessor a reset pulse of a first type to for waking-up said microprocessor on switching-on, and one of said other units being capable, after switching-on, to apply to the microprocessor a reset pulse of a second type constituting a request for performing a given function, a method for accessing a first subprogram or a second subprogram as a function of the type of reset pulse received by the microprocessor comprising the following steps:

providing at said microprocessor a single reset input for receiving both types of reset pulses, after each switching-on of the system, causing a logical data item, different from said reset pulses and readable by said microprocessor, to change from a first state to a second state only after a certain time interval has elapsed since applying a most recent reset pulse, said step of causing the logical data item to change being performed by a circuit connected to a power supply voltage source for the microprocessor and to an input/output terminal of said microprocessor different from said single reset input and adapted to apply to said terminal a signal which passes from a low logic level to a high logic level only after said certain time interval has elapsed, each time a reset pulse is received on said single reset input, reading said logical data item before said certain time interval has elapsed since a most recently applied reset pulse, whereby, if said reset pulse is a reset pulse on switching on, the read logical data item has not yet been changed from said first to said second state, and if said reset pulse is a reset pulse for said request, the read logical data item is already in said second state subsequent to a previous switching-on of the system, and depending on whether said logical data item is in its first state or in its second state, branching said microprocessor either to an initialization subprogram constituting said first subprogram, or else to a subprogram for processing said request and constituting said second subprogram.

2. A system including a microprocessor and other units, said system applying to the microprocessor a reset pulse of a first type for waking-up said microprocessor on switching-on, and one of said other units being capable, after switching-on, to apply to the microprocessor a reset pulse of a second type constituting a request for performing a given function, said microprocessor including a single reset input for receiving both types of reset pulses and being capable of accessing a first subprogram or a second subprogram as a function of the type of reset pulse received by said microprocessor, said system further comprising:

means for causing, after each switching-on of the system, a logical data item, different from said reset pulses and readable by said microprocessor, to change from a first state to a second state only after a certain time interval has elapsed since applying a most recent reset pulse, means for reading said logical data item each time a reset pulse is received on said single reset input and before said certain time interval has elapsed since a most recently applied reset pulse, whereby, if said reset pulse is a reset pulse on switching on, the read logical data item has not yet been changed from said first to said second state, and if said reset pulse is a reset pulse for said request, the read logical data item is already in said second state subsequent to a previous switching-on of the system, and means for branching said microprocessor either to an initialization subprogram constituting said first subprogram or else to a subprogram for processing said request and constituting said second subprogram depending on whether said logical data item is in its first state or in its second state, and further comprising a circuit connected to a power supply voltage source of said microprocessor and to an input/output terminal of said microprocessor different from said single reset input, and adapted to apply to said terminal a signal which passes from a low logic level to a high logic level constituting the second state of the logical data item, only after said certain time interval has elapsed, said circuit comprising a resistor connected between the microprocessor power supply voltage source and the input/output terminal of said microprocessor, and a capacitor connected between said input/output terminal and ground.

3. A system including a microprocessor and other units, said system applying to the microprocessor a reset pulse of a first type for waking-up said microprocessor on switching-on, and one of said other units being capable, after switching-on, to apply to the microprocessor a reset pulse of a second type constituting a request for performing a given function, said microprocessor including a single reset input for receiving both types of reset pulses and being capable of accessing a first subprogram or a second subprogram as a function of the type of reset pulse received by said microprocessor, said system further comprising:

means for causing, after each switching-on of the system, a logical data item, different from said reset pulses and readable by said microprocessor, to change from a first state to a second state only after a certain time interval has elapsed since applying a most recent reset pulse, means for reading said logical data item each time a reset pulse is received on said single reset input and before said certain time interval has elapsed since a most recently applied reset pulse, whereby, if said reset pulse is a reset pulse on switching on, the read logical data item has not yet been changed from said first to said second state, and if said reset pulse is a reset pulse for said request, the read logical data item is already in said second state subsequent to a previous switching-on of the system, and means for branching said microprocessor either to an initialization subprogram constituting said first subprogram or else to a subprogram for processing said request and constituting said second subprogram depending on whether said logical data item is in its first state or in its second state, and further comprising a circuit connected to a power supply voltage source of the microprocessor and to an input/output terminal of said microprocessor, different from said single reset input and adapted to apply to said terminal a signal which passes from a high logic level to a low logic level constituting the second state of the logical data item, only after said certain time interval has elapsed, said circuit comprising a capacitor connected between the microprocessor power supply voltage source and the input/output terminal of said microprocessor, and a resistor connected between said input/output terminal and ground.

4. In a system including a microprocessor and other units, the system applying to the microprocessor a reset pulse of a first type for waking-up said microprocessor on switching-on, and one of said other units being capable, after switching-on, to apply to the microprocessor a reset pulse of a second type constituting a request for performing a given function, a method for accessing a first subprogram or a second subprogram as a function of the type of reset pulse received by the microprocessor comprising the following steps:

providing at said microprocessor a single reset input for receiving both types of reset pulses, after each switching-on of the system, causing a logical data item, different from said reset pulses and readable by said microprocessor, to change from a first state to a second state only after a certain time interval has elapsed since applying a most recent reset pulse, said step of causing the logical data item to change being performed by a circuit connected to a power supply voltage source for the microprocessor and to an input/output terminal of said microprocessor different from said single reset input and adapted to apply to said terminal a signal which passes from a high logic level to a low logic level only after said certain time interval has elapsed, each time a reset pulse is received on said single reset input, reading said logical data item before said certain time interval has elapsed since a most recently applied reset pulse, whereby, if said reset pulse is a reset pulse on switching on, the read logical data item has not yet been changed from said first to said second state, and if said reset pulse is a reset pulse for said request, the read logical data item is already in said second state subsequent to a previous switching-on of the system, and depending on whether said logical data item is in its first state or in its second state, branching said microprocessor either to an initialization subprogram constituting said first subprogram, or else to a subprogram for processing said request and constituting said second subprogram.

* * * * *